United States Patent
Schwarte et al.

(10) Patent No.: US 6,930,161 B2
(45) Date of Patent: Aug. 16, 2005

(54) POLYURETHANE, METHOD FOR PRODUCTION AND USE THEREOF

(75) Inventors: Stephan Schwarte, Emsdetten (DE); Willi Vesper, Wiesentheid (DE); Jose-Ignacio Anaya-Sanz, Madrid (ES); Alain Ledantec, Senlis (FR)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/485,773

(22) PCT Filed: Sep. 25, 2002

(86) PCT No.: PCT/EP02/10724

§ 371 (c)(1), (2), (4) Date: Feb. 4, 2004

(87) PCT Pub. No.: WO03/029319

PCT Pub. Date: Apr. 10, 2003

(65) Prior Publication Data

US 2004/0198941 A1 Oct. 7, 2004

(30) Foreign Application Priority Data

Sep. 26, 2001 (DE) .......................... 101 47 546

(51) Int. Cl.⁷ .............................. C08G 18/80
(52) U.S. Cl. .......................... 528/45; 528/80
(58) Field of Search ..................... 528/45, 80

(56) References Cited

U.S. PATENT DOCUMENTS 4,532,177 A    7/1985  Mahar
6,583,214 B1   6/2003  Haeberle et al.
6,586,523 B1 * 7/2003  Blum et al. ................. 524/840

FOREIGN PATENT DOCUMENTS

| DE | 19914896    | 4/1999 |
| EP | 0583777 A1  | 2/1994 |
| GB | 1280404     | 7/1972 |
| JP | 05005080    | 1/1993 |

* cited by examiner

Primary Examiner—Rachel Gorr

(57) ABSTRACT

A self-crosslinking, branched polyurethane preparable by reacting
 (A) at least one hydroxyl-terminated polyester with a number-average molecular weight of from 500 to 4000 daltons, containing based on the polyester (A)
  (a1) from 60 to 95% by weight of structural units derived from aliphatic starting products and
  (a2) from 5 to 40% by weight of structural units derived from aromatic starting products
with
 (B) at least one partially blocked polyisocyanate containing on average per molecule more than 1.5 and less than 3 free isocyanate groups,
the equivalents ratio of free isocyanate groups in the polyisocyanate (B) to hydroxyl groups in the polyester (A) being >1, to give an isocyanato-terminated polyurethane prepolymer which is chain-extended and/or blocked with
 (C) at least one compound containing on average per molecule at least two isocyanate-reactive functional groups;
process for its preparation, and its use as a binder in coating materials, adhesives, and sealing compounds.

22 Claims, No Drawings

POLYURETHANE, METHOD FOR PRODUCTION AND USE THEREOF

CROSS REFERENCE TO RELATED APPLICATIONS

This application is a National Phase Application of Patent Application PCT/EP02/10724 filed on 25 Sep. 2002, which claims priority to DE 101 47 546.2, filed on 26 Sep. 2001.

The present invention relates to a novel self-crosslinking, branched polyurethane. The present invention also relates to a novel process for preparing a self-crosslinking, branched polyurethane. The present invention additionally relates to the use of the novel, self-crosslinking, branched polyurethane to prepare nonaqueous, color and/or effect coating materials, especially basecoat materials, and coatings, especially basecoats.

Nonaqueous coating materials comprising polyesters or polyurethanes, pigments, and cellulose esters are known from the British patent application GB 2 156 829 A. They may be used to produce multicoat color and/or effect paint systems by the wet-on-wet technique. As is known, in the wet-on-wet technique, the basecoat materials are applied to a substrate, which may have been given a prior coating, and then the resulting basecoat film, without being fully cured, is dried and overcoated with a clearcoat material. Thereafter, the basecoat film and clearcoat film are cured together. The polyurethanes are, however, not specified in any greater detail in the British patent application, although the polyesters are.

The substrate that has been given a prior coating may be a metal bodywork panel which has been coated with a customary and known electrocoat and with a cured primer-surfacer coat. This is the case, for example, for the preparation of the original finish (OEM) of motor vehicles, especially automobiles. In many cases, however, the adhesion of the nonaqueous basecoat materials known to date to the cured primer-surfacer coats is poor.

Additionally, the adhesion of the nonaqueous basecoat materials known to date to the original finishes is also poor, in many cases, when these original finishes have to be extensively or completely refinished on the line at the vehicle manufacturer's premises.

In the course of the attempt to overcome these disadvantages by varying or replacing the binders, there may unforeseeably be an incompatibility between the binders and the cellulose esters, which is extremely disadvantageous for the storage stability and for the optical and effect properties (appearance), the mechanical properties, and the adhesion properties of the coatings produced from them.

It is an object of the present invention to provide a novel, self-crosslinking, branched polyurethane which no longer has the disadvantages of the prior art but which instead is easy to prepare and is very highly compatible with cellulose esters, such as cellulose acetobutyrate (CAB). Moreover, the novel, self-crosslinking, branched polyurethane is to be especially suitable for the preparation of storage-stable, nonaqueous, color and/or effect coating materials comprising polyurethanes, pigments, and CAB. The novel, nonaqueous coating materials should be outstandingly suitable as basecoat materials for producing multicoat color and/or effect paint systems whose intercoat adhesion, even after moisture exposure, mechanical load-bearing properties, and appearance are of such high quality that they may be used directly in original finishes and extensive and complete refinishes of top-class automobiles.

The invention accordingly provides the novel, self-crosslinking, branched polyurethane which is preparable by reacting (A) at least one hydroxyl-terminated polyester with a number-average molecular weight of from 500 to 4000 daltons, containing, based on the polyester (A),
  (a1) from 60 to 95% by weight of structural units derived from aliphatic starting products and
  (a2) from 5 to 40% by weight of structural units derived from aromatic starting products
  with
(B) at least one partially blocked polyisocyanate containing on average per molecule more than 1.5 and less than 3 free isocyanate groups,
the equivalents ratio of free isocyanate groups in the polyisocyanate (B) to hydroxyl groups in the polyester (A) being >1, to give an isocyanato-terminated polyurethane prepolymer which is chain-extended and/or blocked with
(C) at least one compound containing on average per molecule at least two isocyanate-reactive functional groups.

In the text below, the novel, self-crosslinking, branched polyurethane is referred to as "polyurethane of the invention".

The invention additionally provides the novel process for preparing self-crosslinking, branched polyurethanes, which involves reacting (A) at least one hydroxyl-terminated polyester with a number-average molecular weight of from 500 to 4000 daltons, containing based on the polyester (A)
  (a1) from 60 to 95% by weight of structural units derived from aliphatic starting products and
  (a2) from 5 to 40% by weight of structural units derived from aromatic starting products
  with
(B) at least one partially blocked polyisocyanate containing on average per molecule more than 1.5 and less than 3 free isocyanate groups,
the equivalents ratio of free isocyanate groups in the polyisocyanate (B) to hydroxyl groups in the polyester (A) being >1, to give an isocyanato-terminated polyurethane prepolymer which is chain-extended and/or blocked with
(C) at least one compound containing on average per molecule at least two isocyanate-reactive functional groups.

In the text below, the novel process for preparing self-crosslinking, branched polyurethanes is referred to as "process of the invention".

The invention also provides the novel, nonaqueous coating materials comprising (I) at least one polyurethane of the invention,
(II) at least one color and/or effect pigment, and
(III) at least one cellulose ester.

Further subject matter of the invention will emerge from the description.

In the light of the prior art it was surprising and unforeseeable for the skilled worker that the object on which the present invention was based could be achieved with the aid of the polyurethane of the invention. In particular it was surprising that the polyurethane of the invention could be prepared in a simple way with the aid of the process of the invention and it was very highly compatible with cellulose esters, such as cellulose acetobutyrate (CAB). Moreover, the polyurethane of the invention was found to be especially suitable for the preparation of storage-stable, nonaqueous, color and/or effect coating materials comprising polyurethanes, pigments, and CAB. The novel, nonaqueous coating materials were outstandingly suitable as basecoats for preparing multicoat color and/or effect paint systems whose intercoat adhesion, even after moisture exposure, mechanical load-bearing properties, and appearance were of such high quality that the coatings of the invention could be used directly in original finishes and extensive and complete refinishes of top-class automobiles.

The polyurethane of the invention is self-crosslinking.

In the context of the present invention, the term "self-crosslinking" refers to the capacity of a binder to enter into crosslinking reactions with itself. A prerequisite for this is that the polyurethanes contain complementary reactive functional groups which react with one another and so lead to crosslinking. For further details, refer to Römpp Lexikon Lacke und Druckfarben, Georg Thieme Verlag, Stuttgart, N.Y., 1998, "curing", pages 274 to 276, especially page 275, bottom. In the present case, the reactive functional groups are, in particular, isocyanate-reactive functional groups, such as thiol groups, hydroxyl groups, and primary and secondary amino groups, especially hydroxyl groups, on the one hand and blocked isocyanate groups on the other.

The polyurethane of the invention is branched. The branches are preferably introduced by way of the polyisocyanates from which the polyurethanes of the invention are prepared.

The hydroxyl number of the polyurethane of the invention is preferably from 60 to 120, in particular from 80 to 100 mg KOH/g.

It is soluble or dispersible in customary and known organic solvents. Examples of customary and known solvents are described in D. Stoye and W. Freitag (eds.), "Paints, Coatings and Solvents", 2nd, completely revised edition, Wiley-VCH, Weinheim, N.Y., 1998, "14.9. Solvent Groups", pages 327 to 373.

The polyurethane of the invention is preparable by reacting at least one hydroxyl-terminated polyester (A) with at least one partially blocked polyisocyanate (B), after which the resulting isocyanato-terminated polyurethane prepolymer is chain-extended and/or blocked with at least one compound (C).

The polyester (A) has a number-average molecular weight of from 500 to 4000, and in particular from 800 to 3000 daltons. Based on its overall amount it contains
  (a1) from 60 to 95%, preferably from 70 to 92%, and in particular from 75 to 90% by weight of structural units derived from aliphatic starting products and
  (a2) from 5 to 40%, preferably from 8 to 30%, and in particular from 10 to 25% by weight of structural units derived from aromatic starting products.

The aliphatic starting products (a1) comprise aliphatic and cycloaliphatic carboxylic acids, carboxylic anhydrides, and other polycondensable carboxylic acid derivatives, and aliphatic and cycloaliphatic polyols.

Examples of suitable acyclic aliphatic dicarboxylic acids (a1) for use in accordance with the invention include oxalic acid, malonic acid, succinic acid, glutaric acid, adipic acid, pimelic acid, suberic acid, azelaic acid, sebacic acid, undecanedicarboxylic acid, and dodecanedicarboxylic acid, of which adipic acid, glutaric acid, azelaic acid and/or sebacic acid are advantageous and are therefore used with preference.

Examples of suitable cycloaliphatic dicarboxylic acids (a1) for use in accordance with the invention include 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid. The cycloaliphatic dicarboxylic acids may be used either in their cis or in their trans form or as a mixture of both forms.

Examples of suitable polyols (a1) are diols and triols, especially diols. Normally, triols are used alongside the diols in minor amounts in order to introduce branching into the polyesters (A). In the context of the present invention, "minor amounts" are amounts which do not bring about gelling of the polyesterpolyols during their preparation. As already mentioned, however, the branches are introduced preferably by way of the polyisocyanates (B).

Examples of suitable diols (a1) are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene, and 1,3-bis(2'-hydroxypropyl)benzene.

Of these diols (a1), 1,6-hexanediol and neopentyl glycol are particularly advantageous and are therefore used with particular preference.

Examples of suitable triols (a1) are trimethylolethane, trimethylolpropane, and glycerol, especially trimethylolpropane.

Examples of suitable aromatic polycarboxylic acids (a2) are phthalic acid, isophthalic acid, terephthalic acid, phthalic, isophthalic or terephthalic monosulfonate, or halophthalic acids, such as tetrachlorophthalic or tetrabromophthalic acid, of which isophthalic acid is advantageous and is therefore used with preference.

Examples of suitable aromatic polyols (a2) are phenols, such as pyrocatechol, resorcinol, and hydroquinone, and also, in minor amounts, pyrogallol, phloroglucinol and hydroxyhydroquinone.

It is also possible, however, to use lactones (a1), such as caprolactone, or cycloaliphatic hydroxycarboxylic acids and hydroxycarboxylic esters (a1), such as 4-hydroxycyclohexanecarboxylic acid and its esters, and aromatic hydroxycarboxylic acids and hydroxycarboxylic esters (a2), such as salicylic acid and its esters.

Preference is given, however, to using aliphatic dicarboxylic acids (a1) and/or their derivatives and aromatic dicarboxylic acids (a2) and/or their derivatives, on the one hand, and aliphatic diols (a1), on the other.

The weight ratio of structural units (a1) derived from aliphatic dicarboxylic acids and/or their derivatives to structural units (a2) derived from aromatic dicarboxylic acids (a2) and/or their derivatives is preferably from 1.5:1 to 5:1, more preferably from 2:1 to 4:1, and in particular from 2.5:1 to 3.7:1.

The preparation of the hydroxyl-terminated polyesters (A) presents no special features as to its method but instead takes place with the aid of customary and known equipment and techniques, with the water formed during the polycondensation being removed, where appropriate, from the reaction mixture azeotropically with the aid of entrainers, such as cyclohexane or methylcyclohexane.

The partially blocked polyisocyanate (B) contains on average per molecule more than 1.5 and less than 3, preferably more than 1.8 and less than 2.8, and in particular more than 1.9 and less than 2.5 free isocyanate groups.

The partially blocked polyisocyanate (B) is preferably selected from the group consisting of partially blocked polyisocyanates containing isocyanurate, biuret, allophanate, iminooxadiazinedione, urethane, carbodiimide, urea, and uretdione groups.

Preferably, the partially blocked polyisocyanate (B) is prepared from diisocyanates. The diisocyanates are preferably selected from the group consisting of isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, 2-heptyl-3,4-bis(9-isocyanatononyl)-1-pentylcyclohexane, 1,2-, 1,4-, and 1,3-bis(isocyanatomethyl)cyclohexane, 1,2-, 1,4-, and 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobuty-1-yl)cyclohexane, liquid bis(4-isocyanatocyclohexyl)-methane with a trans/trans content of up to 30% by weight, tolylene diisocyanate, xylylene diisocyanate, bisphenylene diisocyanate, naphthylene diisocyanate or diphenylmethane diisocyanate, especially from the group consisting of hexamethylene diisocyanate, isophorone diisocyanate, and bis(4-isocyanatocyclohexyl)methane with a trans/trans content of up to 30% by weight.

For the partial blocking it is possible to employ all customary and known blocking agents. The blocking agents are preferably selected from the group consisting of (i) phenols, such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

(ii) lactams, such as ε-caprolactam, δ-valerolactam, γ-butyrolactam or β-propiolactam;

(iii) active methylenic compounds, such as diethyl malonate, dimethyl malonate, ethyl or methyl acetoacetate, or acetylacetone;

(iv) alcohols, such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

(v) mercaptans, such as butyl mercaptan, hexyl mercaptan, t-butyl mercaptan, t-dodecyl mercaptan, 2-mercaptobenzothiazole, thiophenol, methylthiophenol or ethylthiophenol;

(vi) acid amides, such as acetoanilide, acetoanisidinamide, acrylamide, methacrylamide, acetamide, stearamide or benzamide;

(vii) imides, such as succinimide, phthalimide or maleimide;

(viii) amines, such as diphenylamine, phenylnaphthylamine, xylidine, N-phenylxylidine, carbazole, aniline, naphthylamine, butylamine, dibutylamine or butylphenylamine;

(ix) imidazoles, such as imidazole or 2-ethylimidazole;

(x) ureas, such as urea, thiourea, ethyleneurea, ethylenethiourea or 1,3-diphenylurea;

(xi) carbamates, such as phenyl N-phenylcarbamate or 2-oxazolidone;

(xii) imines, such as ethyleneimine;

(xiii) oximes, such as acetone oxime, formaldoxime, acetaldoxime, acetoxime, methyl ethyl ketoxime, diisobutyl ketoxime, diacetyl monoxime, benzophenone oxime or chlorohexanone oximes;

(xiv) salts of sulfurous acid, such as sodium bisulfite or potassium bisulfite;

(xv) hydroxamic esters, such as benzyl methacrylohydroxamate (BMH) or allyl methacrylohydroxamate; or (xvi) substituted pyrazoles and triazoles; and also (xvii) mixtures of these blocking agents.

The blocking agents are selected in particular from the group consisting of methanol, ethanol, n-propanol, isopropanol, n-butanol, isobutanol, t-butanol, n-amyl alcohol, t-amyl alcohol, n-hexanol, and methyl ethyl ketoxime.

In the reaction of (A) with (B), the equivalents ratio of free isocyanate groups in (B) to hydroxyl groups in (A) is >1, especially >1.2. In general, it was unnecessary to exceed an equivalents ratio of 2.5, especially 2.4.

The isocyanato-terminated polyurethane prepolymer which results during the reaction is chain-extended with at least one, especially one, compound (C) containing per molecule at least two, preferably at least three, and in particular three, isocyanate-reactive functional groups. Examples of suitable isocyanate-reactive functional groups are those described above, particular preference being given to the use of hydroxyl groups and secondary amino groups.

Examples of suitable compounds (C) are known from the German patent application DE 199 14 896 A1, column 10 lines 10 to 52. Particular preference is given to the use of diethanolaamine.

The resulting polyurethane of the invention may be used in a diversity of ways. Preferably it is used as a binder for nonaqueous, solventborne coating materials, adhesives, and sealing compounds.

The coating materials, adhesives, and sealing compounds of the invention are outstandingly suitable for the coating, bonding, and sealing of motor vehicle bodies and parts thereof, the interior and exterior of motor vehicles, the inside and outside of buildings, doors, windows, furniture, and hollow glass articles, and also, in the context of industrial coating, for the coating, bonding, and sealing of small parts, coils, containers, packaging, electrical components, and white goods.

Preferably, the polyurethane of the invention is used as a binder in nonaqueous, color and/or effect coating materials, which are referred to below as "coating materials of the invention".

The coating materials of the invention preferably comprise (I) at least one of the above-described polyurethanes of the invention,
(II) at least one color and/or effect pigment, and
(III) at least one cellulose ester.

The amount of the polyurethane (I) of the invention in the coating material of the invention may vary widely and is guided by the requirements of the case in hand. The amount is preferably from 2 to 70%, more preferably from 3 to 60%, with particular preference from 10 to 55%, and in particular from 12.5 to 50% by weight, based in each case of the binder solids of the coating material of the invention.

Preferably, the color and/or effect pigments (II) are selected from the group consisting of organic and inorganic, color, optical effect, electrically conductive, magnetically shielding or fluorescent pigments, metal powders, anticorrosion pigments, organic and inorganic, transparent or opaque fillers, or nanoparticles, but especially optical effect and color pigments.

Examples of suitable effect pigments (II) are metal flake pigments such as standard commercial aluminum bronzes, aluminum bronzes chromated in accordance with DE 36 36 183 A1, standard commercial stainless steel bronzes, and nonmetallic effect pigments, such as pearlescent pigments and interference pigments, for example, platelet-effect pigments based on iron oxide with a shade from pink to brownish red, and liquid-crystalline effect pigments. For further details, refer to Römpp Lexikon Lacke und Druckfarben, Georg Thieme Verlag, 1998, page 176, "effect pigments" and pages 380 and 381, "metal oxide-mica pigments" to "metal pigments", and to the patents and patent applications DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. Nos. 4,828,826 A, 5,244,649 A, EP 0 736 073 B1, and EP 0 736 076 B1.

Examples of suitable inorganic color pigments (II) are white pigments, such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments (II) are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments" and page 379, "metal complex pigments".

Examples of fluorescent pigments (II) (daylight-fluorescent pigments) are bis(azomethine) pigments.

Examples of suitable electrically conductive pigments (II) are titanium dioxide/tin oxide pigments.

Examples of magnetically shielding pigments (II) are pigments based on iron oxide or chromium dioxide.

Examples of suitable metal powders (II) are powders of metals and metal alloys such as aluminum, zinc, copper, bronze or brass.

An example of an anticorrosion pigment is zinc phosphate.

Examples of suitable organic and inorganic fillers (II) are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, refer to Römpp Lexikon Lacke und Druckfarben, Georg Thieme Verlag, 1998, pages 250 ff., "fillers".

Moreover, it is of advantage to use mixtures of platelet-shaped inorganic fillers such as talc or mica and nonplatelet-shaped inorganic fillers such as chalk, dolomite, calcium sulfates, or barium sulfate, since by this means the viscosity and rheology may be set very effectively.

Examples of suitable transparent fillers (II) are those based on silica, alumina or zirconium oxide.

Suitable nanoparticles (II) are selected from the group consisting of hydrophilic and hydrophobic, especially hydrophilic, nanoparticles based on silica, alumina, zinc oxide, zirconium oxide, and the polyacids and heteropolyacids of transition metals, preferably of molybdenum and tungsten, having a primary particle size <50 nm, preferably from 5 to 50 nm, in particular from 10 to 30 nm. Preferably, the hydrophilic nanoparticles do not have any flatting effect. Particular preference is given to using nanoparticles based on silica.

Very particular preference is given to using hydrophilic pyrogenic silicas whose agglomerates and aggregates have a catenated structure, these silicas being preparable by the flame hydrolysis of silicon tetrachloride in an oxyhydrogen flame. They are sold, for example, by the company Degussa under the brand name Aerosil®. Very particular preference is also given to using precipitated waterglasses, such as nanohectorites, which are sold, for example, by the company Südchemie under the brand name Optigel® or by the company Laporte under the brand name Laponite®. Further suitable nanoparticles are are known from the German patent DE 195 40 623 A1, column 4 line 31 to column 5 line 30.

The pigment concentration of the coating materials of the invention may vary very widely and is guided primarily by the effect which is to be established and/or by the opacity of the color pigments. Preferably, the pigment concentration overall is from 3 to 90%, more preferably from 3 to 35% by weight, based on the solids of the coating material of the invention.

The pigments may be added to the coating material of the invention in any desired way; for example, in the form of a paste. Such pastes preferably include a grinding binder, preferably based on amino resin; at least one organic solvent; and the pigment or a mixture of pigments (cf. also Römpp Lexikon Lacke und Druckfarben, Georg Thieme Verlag, Stuttgart, N.Y., 1998, "pigment preparations", page 452).

As cellulose esters (III) it is preferred to use cellulose acetobutyrates (CAB), such as are described, for example, in Römpp Lexikon Lacke und Druckfarben, Georg Thieme Verlag, Stuttgart, N.Y., 1998, "cellulose acetobutyrates", page 104, or in the British patent application GB 2 156 829 A, page 5 lines 1 to 56. The amount of the cellulose esters (III) may also vary widely and is guided by the requirements of the case in hand. The amount is preferably from 0.5 to 20%, more preferably from 1 to 18%, with particular preference from 2 to 15%, and in particular from 2 to 10% by weight, based in each case on the solids of the coating material of the invention.

The coating materials of the invention may further comprise crosslinking agents. As crosslinking agents it is possible in particular to use the crosslinkers which are known in the coatings field, such as melamine resins, blocked polyisocyanates and/or tris(alkoxycarbonylamino)triazines, which are able to react with free OH groups. Examples of these and other suitable crosslinking agents are described in the German patent application DE 199 24 170 A1, column 10 line 51 to column 12 line 69.

The coating materials of the invention may further comprise customary and known additives typical for coating materials, such as modified polyethylene waxes, epoxidized fatty acid esters, rheological aids, such as those known from the German patent applications DE 199 24 170 A1, DE 199 24 171 A1, and DE 199 24 172 A1 or from the international patent applications WO 00/37520 and WO 00/37521, based on urea. Further examples of suitable additives are known from the German patent application DE 199 24 170 A1, column 13 line 6 to column 14 line 2.

The coating materials of the invention generally have a solids content of preferably from 5 to 60%, more preferably from 7 to 55%, with particular preference from 10 to 50%, and in particular from 10 to 45% by weight.

The preparation of the coating material of the invention has no special features as to its method but instead takes place by the mixing of the constituents described above. This can be done using mixing equipment such as stirred vessels, dissolvers, including inline dissolvers, stirred mills, static mixers, toothed-ring dispersers or extruders. Where appropriate, mixing is carried out in the absence of actinic radiation, in order to prevent damage to the coating material of the invention, which is additionally curable with actinic radiation.

Preferably, the coating materials of the invention are applied to a substrate surface which has been coated with a customary primer-surfacer. As primer-surfacers it is possible to use any physically or thermally curable primer-surfacer known from the prior art (cf. U.S. Pat. No. 4,537,926 A1, EP 0 529 335 A1, EP 0 595 186 A1, EP 0 639 660 A1, DE 44 38 504 A1, DE 43 37 961 A1, WO 89/10387, U.S. Pat. Nos. 4,450,200 A1, 4,614,683 A1 or WO 94/26827). In general, the primer-surfacer film is cured thermally before the coating material of the invention is applied, or the primer-surfacer film is allowed to evaporate for a short time before the coating materials of the invention are applied.

Suitable coating substrates are all surfaces which are not damaged by curing of the coating systems present thereon using heat or using heat and actinic radiation. Suitable substrates consist, for example, of metals, plastics, wood, ceramic, stone, textile, fiber composites, leather, glass, glass fibers, glass wool and rockwool, mineral- and resin-bound building materials, such as plasterboard panels and cement slabs or roof tiles, and also composites of these materials. The surfaces of these materials may have already been painted or otherwise coated.

Following the application of the primer-surfacer, the coating material of the invention is applied to the substrate in a conventional manner, for example, by spraying, brushing, dipping, flowcoating, knifecoating or rolling.

The resultant basecoat film of the invention is generally overcoated with a suitable transparent topcoat or with a clearcoat material. Prior to the application of the clearcoat material, the basecoat film is advantageously left to evaporate for a short time, preferably from 1 to 15 minutes, in particular from 4 to 8 minutes, at a temperature from room temperature to 100° C., in particular from 45 to 100° C. The period of evaporation is dependent on the temperature and may be set across wide ranges.

Suitable clearcoat materials for producing the clearcoats include all customary and known one-component(1K), two-component(2K) or multicomponent(3K, 4K) clearcoat materials, powder clearcoat materials, powder slurry clearcoat materials or UV-curable clearcoat materials.

Thermally curable one-component(1K), two-component (2K) or multicomponent(3K, 4K) clearcoat materials are known from the European patent applications DE 42 04 518 A1, 0 594 068 A1, 0 594 071 A1, 0 594 142 A1, 0 604 992 A1 or 0 596 460 A1, the international patent applications WO 94/10211, WO 94/10212, WO 94/10213, WO 94/22969 or WO 92/22615, or the American patents U.S. Pat. Nos. 5,474,811 A, 5,356,669 A or 5,605,965 A.

One-component(1K) clearcoat materials are known to comprise hydroxyl-containing binders and crosslinking agents such as blocked polyisocyanates, tris (alkoxycarbonylamino)triazines and/or amino resins. In a further variant they comprise, as binders, polymers containing pendant carbamate and/or allophanate groups, and carbamate- and/or allophanate-modified amino resin crosslinking agents (cf. the American patents U.S. Pat. Nos. 5,474,811 A, 5,356,669 A, and 5,605,965 A1, the international patent applications WO 94/10211, WO 94/10212 and WO 94/10213, or the European patent applications EP 0 594 068 A1, 0 594 071 A1, and 0 594 142 A1).

Of two-component(2K) or multicomponent(3K, 4K) clearcoat materials it is known that their essential constituents comprise hydroxyl-containing binders and polyisocyanate crosslinking agents, which are stored separately until they are used.

Thermally curable powder clearcoat materials are known, for example, from the German patent application DE 42 22 194 A1, the BASF Lacke+Farben AG product information material "Pulverlacke" [powder coating materials], 1990, or the BASF Coatings AG brochure "Pulverlacke, Pulverlacke für industrielle Anwendungen" [powder coating materials, powder coatings for industrial applications], January 2000.

The essential constituents of powder clearcoat materials are known to comprise binders containing epoxide groups, and polycarboxylic acid crosslinking agents.

Examples of suitable powder slurry clearcoat materials are known from the U.S. Pat. No. 4,268,542 A1 and from the patent applications DE 195 40 977 A1, DE 195 18 392 A1, DE 196 17 086 A1, DE 196 13 547 A1, EP 0 652 264 A1, DE 196 18 657 A1, DE 196 52 813 A1, DE 196 17 086 A1, and DE 198 14 471 A1.

Powder slurry clearcoat materials are known to comprise powder clearcoat materials in dispersion in an aqueous medium.

Clearcoat materials, powder clearcoat materials, and powder slurry clearcoat materials that are curable with actinic radiation are known, for example, from the European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, the German patent applications DE 198 35 206 A1, DE 197 09 467 A1, DE 42 03 278 A1, DE 33 16 593 A1, DE 38 36 370 A1, DE 24 36

186 A1, and DE 20 03 579 B1, the international patent applications WO 97/46549 and WO 99/14254, or the American patents U.S. Pat. Nos. 5,824,373 A, 4,675,234 A, 4,634,602 A, 4,424,252 A, 4,208,313 A, 4,163,810 A, 4,129,488 A, 4,064,161 A, and 3,974,303 A.

Clearcoat materials, powder clearcoat materials, and powder slurry clearcoat materials that are curable both thermally and with actinic radiation are known, for example, from the patent applications DE 198 18 735 A1, WO 98/40170, DE 199 08 013 A1, DE 199 08 018 A1, EP 0 844 286 A1, and EP 0 928 800 A1.

In general, the clearcoat materials are applied in a wet film thickness such that curing thereof results in clearcoats having the thicknesses that are advantageous and necessary for their functions. They are preferably from 10 to 100 μm, more preferably from 15 to 80 μm, with particular preference from 20 to 75 μm, and in particular from 25 to 70 μm.

Following application, the color and/or effect basecoat films are cured thermally together with the clearcoat films and also, where appropriate, with the primer-surfacer films.

Curing may take place after a certain rest period or flash-off time. This may have a duration of from 30 s to 2 h, preferably from 1 min to 1 h, and in particular from 1 min to 45 min. The rest period serves, for example, for the leveling and devolatilization of the films and for the evaporation of volatile constituents such as any solvent that is still present.

The thermal cure has no special features as to its method but instead takes place in accordance with the customary and known methods, such as heating in a forced-air oven in countercurrent or irradiation using IR and/or NIR lamps. Advantageously, the thermal cure takes place at temperatures from 90 to 180° C.

The coating materials or basecoat materials of the invention are outstandingly suitable for producing decorative, functional, effect and/or protective, single-coat and multicoat paint systems of motor vehicle bodies and parts thereof, the interior and exterior of motor vehicles, the inside and outside of buildings, doors, windows, furniture, and hollow glass articles, and also in the context of the industrial coating of small parts, coils, containers, packaging, electrical components, and white goods.

In the extensive or complete refinish of single-coat and multicoat color and/or effect paint systems, especially of original finishes of motor vehicle bodies on the line, it is possible to apply the coating materials of the invention directly to the surface that is to be repaired, without special pretreatment and/or auxiliaries.

The single-coat and multicoat effect paint systems of the invention are of the highest optical quality as regards color, effect, gloss, and DOI (distinctness of the reflected image), have a smooth, textureless, hard, flexible, and scratch-resistant surface, are stable to weathering, chemicals, and etching, do not yellow, and do not exhibit any cracking or delamination of the coats or damage to the pigments (II). This is the case both for the original finishes and for the refinishes.

Accordingly, the substrates of the invention as well, particularly bodies of automobiles and commercial vehicles, the inside and outside of buildings, industrial components, including plastics parts, small parts, packaging, coils, white goods, and electrical components, or furniture, doors, windows or hollow glass articles, that are coated with at least one coating of the invention exhibit particular technical and economic advantages, in particular a long service life, which makes them particularly attractive to users.

EXAMPLES

Preparation Example 1

The Preparation of a Pearl Effect Pigment Paste A

The pearl effect pigment paste A was prepared from 20 parts by weight of Merlin® Extra Fine Russet 459 V, 13.5 parts by weight of a 6 percent dispersion of a modified polyethylene wax in butyl acetate/Solventnaphtha®, 18 parts by weight of cellulose acetobutyrate (CAB) solution (15 percent strength solution of a cellulose acetobutyrate from Eastman with an acetyl content of from 13 to 16% by weight and a butyrate content of from 33 to 38.9% by weight, dissolved in a mixture of butyl acetate and isotridecyl alcohol in a weight ratio of 23:1) and 4.5 parts by weight of butyl acetate.

Preparation Example 2

Preparation of a Pigment Paste A 34 parts by weight of Irgazin® DPP Red BO were ground in 50 parts by weight of a binder mixture composed of CAB solution (cf. Preparation Example 1) and of a partially butanol-etherified, moderately reactive melamine resin (55 percent in butanol) in a weight ratio of 1:1, 11 parts by weight of butyl acetate and 5 parts by weight of butyl glycol acetate.

Preparation Example 3

Preparation of a Pigment Paste B 27 parts by weight of Novoperm® Red F2RK70 were ground in 50 parts by weight of a binder mixture composed of CAB solution and melamine resin (cf. Preparation Example 2), 18 parts by weight of butyl acetate and 5 parts by weight of butyl glycol acetate.

Preparation Example 4

Preparation of a Pigment Paste C 11 parts by weight of Irgazin® Red A2 BN were ground in 50 parts by weight of a binder mixture composed of CAB solution and melamine resin (cf. Preparation Example 2), 34 parts by weight of butyl acetate and 5 parts by weight of butyl glycol acetate.

Preparation Example 5

Preparation of a Pigment Paste D 13 parts by weight of Paliogen® Red 3885 were ground in 50 parts by weight of a binder mixture composed of CAB solution and melamine resin (cf. Preparation Example 2), 32 parts by weight of butyl acetate and 5 parts by weight of butyl glycol acetate.

Preparation Example 6

Preparation of a Pigment Paste E 9.5 parts by weight of Hostaperm® Pink E 3885 were ground in 50 parts by weight of a binder mixture composed of CAB solution and melamine resin (cf. Preparation Example 2), 35.5 parts by weight of butyl acetate and 5 parts by weight of butyl glycol acetate.

Preparation Example 7

Preparation of a Pigment Paste F 6 parts by weight of carbon black FW2 were ground in 50 parts by weight of a binder mixture composed of CAB solution and melamine resin (cf. Preparation Example 2), 39 parts by weight of butyl acetate and 5 parts by weight of butyl glycol acetate.

Example 1

The Preparation of an Inventive Polyurethane

A stirred vessel equipped with stirrer, dropping funnel, internal thermometer, reflux condenser and electrical heating was charged with 44.24 parts by weight of methyl ethyl ketone and 196.65 parts by weight of the isocyanurate of hexamethylene diisocyanate (Desmodur ® N 3300 from Bayer AG) and this initial charge was heated to 60° C. Then 32.35 parts by weight of butanol were added dropwise at such a rate that the temperature of the reaction mixture did not exceed 80° C. Following complete reaction of the butanol, 342.24 parts by weight of a polyester (A) (composed of 36.36 mol % adipic acid, 9.09 mol % isophthalic acid and 54.55 mol % hexanediol; acid number: 4 mg KOH/g; solids content: 50% by weight; solvent content: 20 percent by weight butyl acetate and 30% by weight methyl ethyl ketone) were added. The temperature of the reaction mixture was held at 80° C. until the isocyanate content was constant. Then the reaction mixture was cooled to 60°Celsius. At this temperature, the isocyanate groups of the polyurethane prepolymer were reacted with an equimolar amount of diethanolamine. Subsequently, the methyl ethyl ketone was distilled off. The inventive polyurethane was adjusted to a solids content of 55% by weight (1 hour/130° C.) (solvent content: 20% by weight Solventnaphtha®, 20% by weight butanol, 4% by weight butyl acetate and <1% by weight methyl ethyl ketone).

The inventive polyurethane was outstandingly suitable for the preparation of coating materials, adhesives, and sealing compounds.

Example 2

The Preparation of an Inventive Coating Material (Basecoat Material)

150 parts by weight of a 6 percent dispersion of a modified polyethylene wax in butyl acetate/Solventnaphtha® were charged to a suitable stirred vessel. Added to this initial charge in the stated sequence were 85 parts by weight of a CAB solution (cf. Preparation Example 1), 65 parts by weight of the polyurethane (A) of Example 1, 60 parts by weight of a urea- and polyester-based rheological aid (Setal® 90173 from Akzo), 56 parts by weight of a melamine resin (cf. Preparation Example 2), 15 parts by weight of hexamethoxymethylmelamine, 10 parts by weight of an epoxidized fatty acid ester, 10 parts by weight of butyldiglycol acetate, 60 parts by weight of butyl glycol acetate, 170 parts by weight of the pigment paste D of Preparation Example 5, 21 parts by weight of the pigment paste E of Preparation Example 6, 13 parts by weight of the pigment paste F of Preparation Example 7, and 56 parts by weight of the pearl effect pigment paste A from Preparation Example 1, after which the resulting mixture was homogenized. The inventive basecoat material was stable on storage. For application, it was adjusted with butyl acetate to a spray viscosity of 26 s in the DIN 4 efflux cup.

Comparative Example C1

The Preparation of a Noninventive Basecoat Material

Example 1 was repeated using in place of the inventive polyurethane a commercially customary polyester resin suitable for preparing OEM basecoat materials (solids content: 60% by weight, solvent content: 40% by weight butyl acetate/solvent naphtha 1:1).

Example 3 and Comparative Example C2

The Production of an Inventive (Example 3) and of a Noninventive (Example C2) Multicoat Color and Effect Paint System For Example 3, the inventive basecoat material of Example 2 was used.

For the Comparative Example C2, the noninventive basecoat material of Example C1 was used.

For testing the performance properties of the basecoat materials, test panels measuring 10 by 30 cm were produced in a conventional and known manner. This was done by coating metal bodywork panels, which had already been coated with a customary and known, cathodic electrocoat and baked, with a commercial primer-surfacer from BASF Coatings AG. The resulting primer-surfacer films were flashed off at 20° C. for 5 minutes, at a relative humidity of 65%, and baked in a forced-air oven at 140° C. for 30 minutes. Following flashing off and cooling of the test panels to 20° C., the basecoat materials were applied to the test panels by automated pneumatic spray application under the application conditions which are customary for automotive basecoat materials, with a film thickness of from 12 to 15 $\mu$m. Following a flash-off time of 5 minutes, the basecoat films were overcoated wet-on-wet with a commercial one-component clearcoat material from BASF Coatings AG. Subsequently, the clearcoat films and the basecoat films were baked together at 140° C. for 20 minutes. This gave the inventive multicoat paint system of Example 1 and the noninventive multicoat paint system of Example C1. Each clearcoat had a film thickness of 40 $\mu$m.

In order to simulate refinishes, the inventive multicoat paint system of Example 1 was coated again with the inventive basecoat and the clearcoat, in the manner described above, and the noninventive multicoat paint system was coated again with the noninventive basecoat and the clearcoat, in the manner described above.

The stonechip resistance of the refinishes was tested by means of the VDA [German Automakers' Association] multi-impact test (pressure: 2 bar and two times 500 g of steel shot). In this test, the inventive refinish of Example 3 (SR 1-2) proved to be more stonechip-resistant than the noninventive refinish of Example C2 (SR 2-3).

Additionally, the single-impact resistance was tested in accordance with the BMW mono-impact test. Here again, the inventive refinish (extent of flaking: 3.5 mm) was markedly superior to the noninventive refinish (extent of flaking: 6 mm).

Example 4

The Preparation of an Inventive Color Basecoat Material 90 parts by weight of a 6 percent dispersion of a modified polyethylene wax in butyl acetate/Solventnaphtha® were charged to a suitable stirred vessel. Added with stirring to this initial charge were 30 parts by weight of a CAB solution (cf. Preparation Example 1), 156 parts by weight of the inventive polyurethane of Example 1, 5 parts by weight of a melamine resin (cf. Preparation Example 2), 18 parts by weight of an epoxidized fatty acid ester, 17 parts by weight of butyl glycol acetate, 120 parts by weight of the pigment paste A of Preparation Example 2, 56 parts by weight of the pigment paste B of Preparation Example 3, 220 parts by weight of the pigment paste C of Preparation Example 4, 2 parts by weight of a one percent solution of a phenyl-containing polydimethylsiloxane in xylene (95%)/butanol (4%), 1 part by weight of a solution of a modified urea (Byk® 410 from Byk Chemie) and 282 parts by weight of butyl acetate.

The inventive basecoat material was stable on storage. For application, it was adjusted with butyl acetate to a spray viscosity of 26 s in the DIN 4 efflux cup.

Comparative Example C3

The Preparation of a Noninventive Color Basecoat Material

Example 4 was repeated, using 160 parts by weight of Setal® 90173 in place of the 156 parts by weight of the inventive polyurethane.

Example 5 and Comparative Example C4

The Production of an Inventive (Example 5) and of a Noninventive (Example C4) Multicoat Color Paint System For Example 5, the inventive basecoat of Example 4 was used.

For Example C4, the noninventive basecoat material of Example C3 was used.

For determining the Renault stonechip resistance of the refinish, the test panels were produced as described for Examples 3 and C2.

For determining the Renault windshield bonding, the test panels were produced as described for Examples 3 and C2, the primer-surfacer films being baked at 150° C. for 15 minutes and the basecoat and clearcoat films at 140° C. for 15 minutes. Additionally, the clearcoats were produced in a coat thickness of 25 μm instead of 40 μm. The resulting test panels were provided with a sealer 2 hours following their production. The test panels were conditioned for 7 days at room temperature and a relative humidity of from 45 to 55%. In each case, half of the sealer was removed from the test panels using a cutter. The test panels were then subjected to the cataplasm test at 60° C. for 7 days. Thereafter, the second half of the sealer was removed with a cutter. Ideally, there should be no discernible delamination.

In terms of the Renault stonechip resistance, the inventive refinish of Example 5 (COT 3) was definitively superior to the noninventive refinish of Example C4 (COT 5). In the windshield bonding test, the inventive multicoat paint system of Example 5 was again definitively superior (0% delamination following exposure) to the noninventive multicoat paint system of Example C4 (100% delamination following exposure).

For determining the PSA stonechip resistance of the refinishes, the test panels were produced as described for Examples 3 and C2 except that the primer-surfacer films were baked at 145° C. for 20 minutes.

The test panels were subjected to the VDA multiple stonechip test. Following the test, they were stored for 24 hours in a Bac Ford (water immersion test in which the test panels were stored in deionized water at 30° C. for 24 hours). They were then again tested by the VDA multiple stonechip test. In this test as well, the inventive refinish of Example 5 (COT A) was definitively superior to the noninventive refinish of Example C4 (COT C).

Furthermore, the Renault stonechip resistance of the original finishes following moisture exposure was tested in the same way. The results obtained were the same as those for the refinishes.

What is claimed is:

1. A self-crosslinking, branched polyurethane comprising a reaction product of an isocyanato-terminated polyurethane prepolymer and at least one compound containing on average per molecule at least two isocyanate-reactive functional groups, wherein the isocyanato-terminated polyurethane comprises a reaction product of
    (A) at least one hydroxyl-terminated polyester with a number-average molecular weight of from 500 to 4000 daltons, containing, based on the polyester (A),
        (a1) from 60 to 95% by weight of structural units derived from aliphatic starting products and
        (a2) from 5 to 40% by weight of structural units derived from aromatic starting products, and
    (B) at least one partially blocked polyisocyanate containing on average per molecule more than 1.5 and less than 3 free isocyanate groups,
wherein an equivalents ratio of free isocyanate groups in the polyisocyanate (B) to hydroxyl groups in the polyester (A) is >1.

2. The polyurethane of claim 1, wherein the hydroxyl-terminated polyester has a number-average molecular weight of from 800 to 3000 daltons.

3. The polyurethane of claim 1, wherein the hydroxyl-terminated polyester (A) contains, based on (A), from 70 to 92% by weight of structural units (a1) and from 8 to 30% by weight of structural units (a2).

4. The polyurethane of claim 1, wherein the weight ratio of structural units (a1) derived from aliphatic dicarboxylic acids and/or dicarboxylic acid derivatives to structural units (a2) derived from aromatic dicarboxylic acids and/or dicarboxylic acid derivatives is from 1.5:1 to 5:1.

5. The polyurethane of claim 1, wherein the partially blocked polyisocyanate (B) contains on average per molecule more than 1.9 and less than 2.5 free isocyanate groups.

6. The polyurethane of claim 1, wherein the partially blocked polyisocyanate (B) contains at least one of an isocyanurate group, a biuret group, an allophanate group, an iminooxadiazinedione group, a urethane group, a carbodiimide group, a urea group, and a uretdione group.

7. The polyurethane of claim 6, wherein the partially blocked polyisocyanate (B) is prepared from diisocyanates.

8. The polyurethane of claim 7, wherein the diisocyanates are selected from the group consisting of isophorone diisocyanate, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-tri-methylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate, 2-heptyl-3,4-bis (9-isocyanatononyl)-1-pentylcyclohexane, 1,2-, 1,4-, and 1,3-bis(isocyanatomethyl)cyclohexane, 1,2-, 1,4-, and 1,3-bis(2-isocyanatoeth-1-yl)cyclohexane, 1,3-bis(3-isocyanatoprop-1-yl)cyclohexane, 1,2-, 1,4- or 13-bis(4-isocyanatobuty-1-yl)cyclohexane, liquid bis(4-isocyanatocyclohexyl)methane with a trans/trans content of up to 30% by weight, tolylene diisocyanate, xylylene diisocyanate, bisphenylene diisocyanate, naphthylene diisocyanate, diphenylmethane diisocyanate, and combinations thereof.

9. The polyurethane of claim 8, wherein the diisocyanates are selected from the group consisting of hexamethylene diisocyanate, isophorone diisocyanate, bis(4-isocyanatocyclohexyl)methane with a trans/trans content of up to 30% by weight, and combinations thereof.

10. The polyurethane of claim 1, wherein the at least one partially blocked polyisocyanate is blocked with a blocking agent selected from the group consisting of
   (i) phenols;
   (ii) lactams;
   (iii) active methylenic compounds;
   (iv) alcohols;
   (v) mercaptans;
   (vi) acid amides;
   (vii) imides;
   (viii) amines;
   (ix) imidazoles;
   (x) ureas;
   (xi) carbamates;
   (xii) imines;
   (xiii) oximes;
   (xiv) salts of sulfurous acid;
   (xv) hydroxamic esters;
   (xvi) substituted pyrazoles;
   (xvii) substituted triazoles; and
   (xviii) combinations thereof.

11. The polyurethane of claim 10, wherein the blocking agents are selected from the group consisting of methanol, ethanol, n-propanol, isopropanol, n-butanol, isobutanol, t-butanol, n-amyl alcohol, t-amyl alcohol, n-hexanol, methyl ethyl ketoxime, and combinations thereof.

12. The polyurethane of claim 1, wherein the equivalents ratio of free isocyanate groups in (B) to hydroxyl groups in (A) is >1.2.

13. The polyurethane of claim 1, wherein the at least one compound containing on average per molecule at least two isocyanate-reactive functional groups contains per molecule three isocyanate-reactive functional groups.

14. The polyurethane of claim 13, wherein the isocyanate-reactive functional groups are selected from the group consisting of hydroxyl groups, thiol groups, primary amino group, secondary amino groups, and combinations thereof.

15. The polyurethane of claim 14, wherein the isocyanate-reactive functional groups are selected from hydroxyl groups, secondary amino groups, and combinations thereof.

16. The polyurethane of claim 15, wherein the at least one compound containing on average per molecule at least two isocyanate-reactive functional groups is an amino alcohol.

17. A process for preparing the polyurethane of claim 1, comprising
   I) reacting
      (A) the at least one hydroxyl-terminated polyester with
      (B) the at least one partially blocked polyisocyanate, to give the isocyanato-terminated polyurethane prepolymer, and
   II) chain extending and/or blocking the isocyanato-terminated polyurethane prepolymer with at least one compound containing on average per molecule at least two isocyanate-reactive functional groups.

18. The polyurethane of claim 1, wherein the polyurethane is a binder in one of a coating material, an adhesive, or a sealing compound.

19. The polyurethane of claim 18, wherein the coating material is a nonaqueous color and/or effect coating material.

20. A method comprising applying the color and/or effect coating material of claim 19 to a substrate and forming a multicoat color and/or effect paint system.

21. A method comprising applying the polyurethane of claim 1 to a substrate, wherein the substrate is one of a motor vehicle body, a motor vehicle part, a building, a door, a window, furniture, a hollow glass article, a part, a coil, a container, a packaging, an electrical component, or a white good.

22. A nonaqueous color and/or effect coating material comprising
   (I) at least one self-crosslinking, branched polyurethane of claim 1,
   (II) at least one color and/or effect pigment, and
   (III) at least one cellulose ester.

* * * * *